United States Patent
Lo et al.

(10) Patent No.: US 8,363,438 B2
(45) Date of Patent: Jan. 29, 2013

(54) MULTI-OUTPUT BUCK CONVERTING APPARATUS WITH CONTROLLABLE ENERGY-RELEASING FUNCTION

(75) Inventors: Cheng-Yi Lo, Taipei (TW); Kuo-Jung Lin, Taipei (TW)

(73) Assignee: Delta Electronics, Inc., Taoyuan County (TW)

( * ) Notice: Subject to any disclaimer, the term of this patent is extended or adjusted under 35 U.S.C. 154(b) by 363 days.

(21) Appl. No.: 12/774,956

(22) Filed: May 6, 2010

(65) Prior Publication Data

US 2011/0157947 A1 Jun. 30, 2011

(30) Foreign Application Priority Data

Dec. 31, 2009 (TW) ................................ 98146284 A

(51) Int. Cl.
*H02M 7/48* (2007.01)
*H02M 3/335* (2006.01)
(52) U.S. Cl. ...................... 363/71; 363/21.04; 363/21.12
(58) Field of Classification Search ............... 363/21.04, 363/21.12, 71; 323/272
See application file for complete search history.

(56) References Cited

U.S. PATENT DOCUMENTS

| 7,408,793 | B2* | 8/2008 | Jitaru et al. | 363/52 |
| 7,518,263 | B2* | 4/2009 | Gan et al. | 307/32 |
| 2004/0080273 | A1* | 4/2004 | Ito et al. | 315/77 |
| 2004/0130302 | A1* | 7/2004 | Ostojic | 323/272 |
| 2007/0252563 | A1* | 11/2007 | Kumagai et al. | 323/267 |

* cited by examiner

*Primary Examiner* — Adolf Berhane
*Assistant Examiner* — Emily Pham
(74) *Attorney, Agent, or Firm* — Muncy, Geissler, Olds & Lowe, PLLC

(57) ABSTRACT

A multi-output buck converting apparatus with a controllable energy-releasing function includes a main buck converter and at least one auxiliary buck converter to provide multi-output voltages. The multi-output buck converting apparatus further includes an energy releasing unit and an abnormal voltage signal generating unit. The abnormal voltage signal generating unit generates a control signal to control a switch device of the energy releasing unit when the multi-output buck converting apparatus shuts down. Therefore, the energy, which is stored in the auxiliary buck converter, can be released through the energy releasing unit so as to avoid returning the energy to the main buck converter and rebounding a main output voltage.

6 Claims, 4 Drawing Sheets

MULTI-OUTPUT BUCK CONVERTING APPARATUS WITH CONTROLLABLE ENERGY-RELEASING FUNCTION

BACKGROUND OF THE INVENTION

1. Field of the Invention

The present invention relates to a buck converting apparatus, and more particularly to a multi-output buck converting apparatus with a controllable energy-releasing function.

2. Description of Prior Art

Due to the load demand of computer systems in computer system application technologies, a power supply usually provides different voltage levels by using buck converters. In order to make the computer system normally work, time sequences of controlling the different output voltages must be coordinated to each other. Because of inherent characteristics of the buck converter, the buck converter may be functioned as a boost converter; and, as a result that the output voltage rebounds to higher than the input voltage while shutting down the computer system. Under this condition, the abnormal output voltage will influence the time sequences required from the computer system so that the computer system can not be shut down normally.

Accordingly, it is desirable to provide a multi-output buck converting apparatus with a controllable energy-releasing function to overcome problems of returning the stored energy and rebounding the main output voltage. Therefore, the multi-output buck converting apparatus can be shut down normally.

SUMMARY OF THE INVENTION

In order to solve above-mentioned problems, a multi-output buck converting apparatus with a controllable energy-releasing function is disclosed. The multi-output buck converting apparatus includes a main buck converter and at least one auxiliary buck converter to provide multi-output voltages. The main buck converter has a main output terminal to provide a main output voltage to the ground, and the auxiliary buck converter is electrically connected to the main buck converter and has an auxiliary output terminal to provide an auxiliary output voltage to the ground. The multi-output buck converting apparatus further includes an energy releasing unit and an abnormal voltage signal generating unit.

The energy releasing unit is electrically connected between the auxiliary output terminal of the auxiliary buck converter and the ground. The energy releasing unit includes a diode, an active load, and a switch device. The diode has an anode terminal and a cathode terminal. The anode terminal is electrically connected to the auxiliary output terminal of the auxiliary buck converter to provide a forward conduction path for releasing energy stored in the auxiliary buck converter. The switch device is electrically connected to the active load in series to form a serially-connected unit. One terminal of the serially-connected unit is electrically connected to the cathode terminal of the diode and the other terminal of the serially-connected unit is electrically connected to the ground.

The abnormal voltage signal generating unit is electrically connected to an input terminal of the main buck converter to generate a control signal. The switch device is closed by a transition of the control signal from a low level to a high level when the multi-output buck converting apparatus shuts down.

Therefore, the switch device is controlled to be closed by the control signal to release the energy, which is stored in the auxiliary buck converter, through the energy releasing unit so as to avoid returning the energy to the main buck converter and rebounding the main output voltage.

In order to solve above-mentioned problems, a multi-output buck converting apparatus with a controllable energy-releasing function is disclosed. The multi-output buck converting apparatus includes a main buck converter and at least one auxiliary buck converter to provide multi-output voltages. The main buck converter has a main output terminal to provide a main output voltage to the ground, and the auxiliary buck converter is electrically connected to the main buck converter and has an auxiliary output terminal to provide an auxiliary output voltage to the ground. The multi-output buck converting apparatus further includes an energy-releasing switch device and an abnormal voltage signal generating unit.

The energy-releasing switch device is electrically connected between an input terminal of the auxiliary buck converter and the main buck converter.

The abnormal voltage signal generating unit is electrically connected to an input terminal of the main buck converter to generate a control signal. The energy-releasing switch device is opened by a transition of the control signal from a high level to a low level when the multi-output buck converting apparatus shuts down.

Therefore, the energy-releasing switch device is controlled to be opened by the control signal so as to avoid returning the energy, which is stored in the auxiliary buck converter, to the main buck converter and rebounding the main output voltage.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1A:
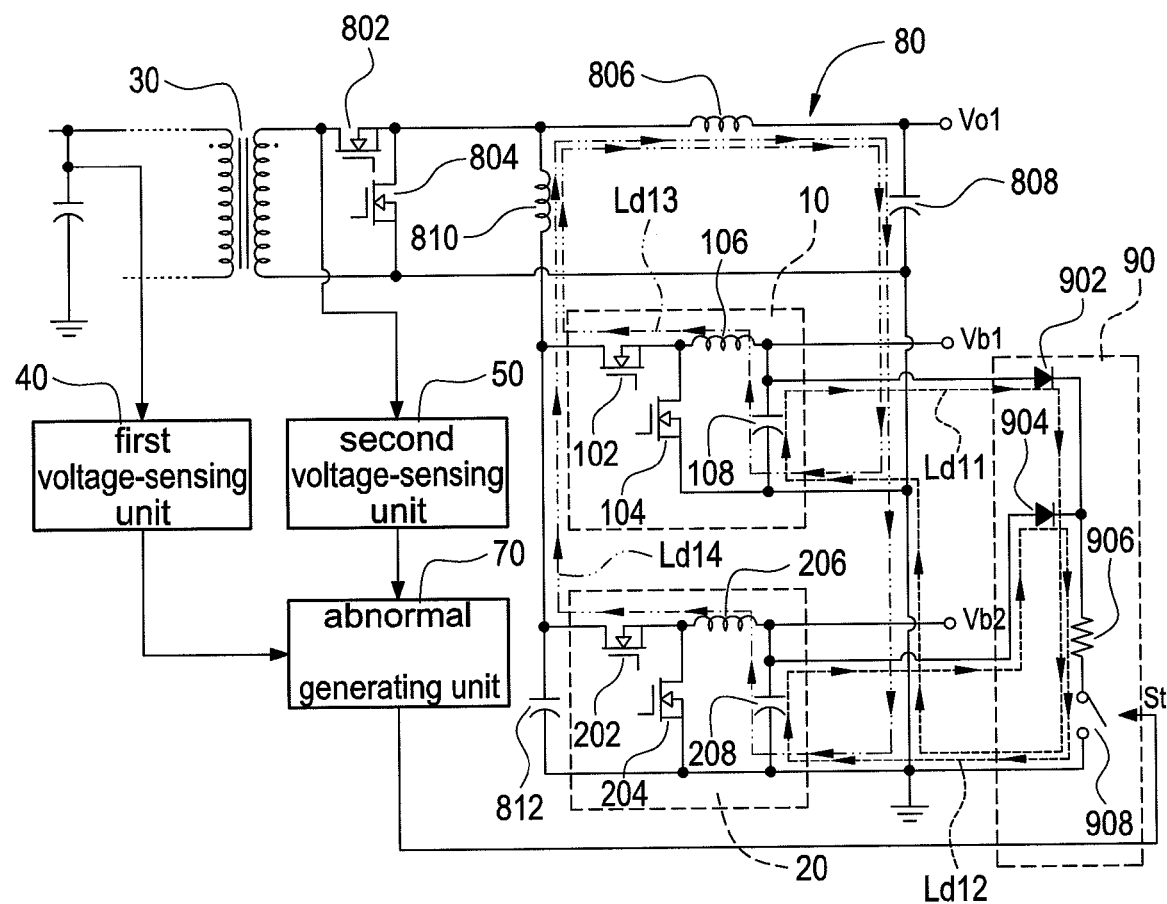
FIG. 1A is a circuit diagram of a first embodiment of a multi-output buck converting apparatus with a controllable energy-releasing function according to the present invention.

Reference will now be made to the drawing figures to describe the present invention in detail.

Figure 1B:
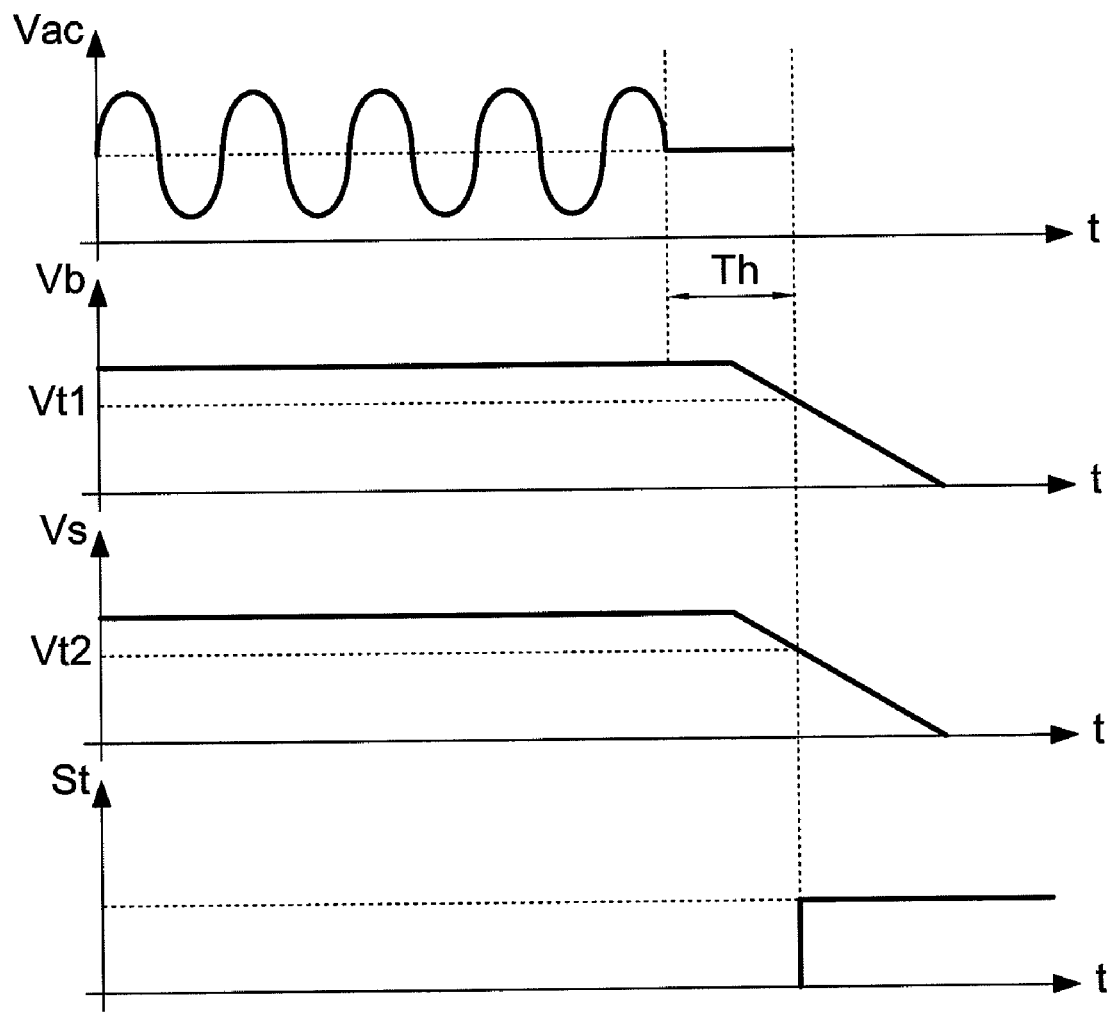
FIG. 1B is a timing diagram of shutting down the multi-output buck converting apparatus in the first embodiment.

Reference is made to FIG. 1A and FIG. 1B which are a circuit diagram of a first embodiment of a multi-output buck converting apparatus with a controllable energy-releasing function and a timing diagram of shutting down the multi-output buck converting apparatus in the first embodiment, respectively. The multi-output buck converting apparatus includes a main buck converter 80 and at least one auxiliary buck converter to provide multi-output voltages. In this example, two auxiliary buck converters are exemplified for further demonstration. Namely, the multi-output buck converting apparatus includes a first auxiliary buck converter 10 and a second auxiliary buck converter 20. The main buck converter 80 has a main output terminal Vo1 to provide a main output voltage (not labeled) to the ground (not labeled). The first auxiliary buck converter 10 is electrically connected to the main buck converter 80 and has a first auxiliary output terminal Vb1 to provide a first auxiliary output voltage (not labeled) to the ground. More particularly, the main output voltage of the main buck converter 80 is higher than the first auxiliary output voltage of the first auxiliary buck converter 10. In addition, the second auxiliary buck converter 20 is electrically connected to the main buck converter 80 and has a second auxiliary output terminal Vb2 to provide a second auxiliary output voltage (not labeled) to the ground. More particularly, the main output voltage of the main buck converter 80 is higher than the second auxiliary output voltage of the second auxiliary buck converter 20.

The multi-output buck converting apparatus further includes an energy releasing unit 90. The energy releasing unit 90 has a first diode 902, a second diode 904, an active load 906, and a switch device 908. Each of the diodes 902, 904 has an anode terminal (not labeled) and a cathode terminal (not labeled). The anode terminal of the first diode 902 is electrically connected to the first auxiliary output terminal Vb1 of the first auxiliary buck converter 10 to provide a forward conduction path for releasing energy stored in the first auxiliary buck converter 10. The anode terminal of the second diode 904 is electrically connected to the second auxiliary output terminal Vb2 of the second auxiliary buck converter 20 to provide a forward conduction path for releasing energy stored in the second auxiliary buck converter 20. In addition, the cathode terminal of the first diode 902 is electrically connected to the cathode terminal of the second diode 904. The active load 906 is electrically connected to the switch device 908 in series to form a serially-connected unit (not labeled). Also, one terminal of the serially-connected unit is electrically connected to the cathode terminal of the first diode 902 (namely the cathode terminal of the second diode 904) and the other terminal of the serially-connected unit is electrically connected to the ground.

The multi-output buck converting apparatus further includes an abnormal voltage signal generating unit 70, and the abnormal voltage signal generating unit 70 generates a control signal St. As shown in FIG. 1A, a front-end transformer 30 is electrically connected to the main buck converter 80 to provide an energy conversion between the primary side and the secondary side.

A detailed description of one circuit topology in the first embodiment is provided as follows. A first voltage-sensing unit 40 is electrically connected to a primary side of the transformer 30 to sense a primary-side voltage Vb of the transformer 30. The abnormal voltage signal generating unit 70 is electrically connected to the first voltage-sensing unit 40 and receives the primary-side voltage Vb to compare it with a first threshold voltage Vt1 (as shown in FIG. 1B). When the multi-output buck converting apparatus shuts down, an external AC voltage Vac stops the power supplied to the multi-output buck converting apparatus. Because of an inherent characteristic of holding voltage for a capacitor, the primary-side voltage Vb gradually decreases in a hold-up time Th. When the primary-side voltage Vb is lower than the first threshold voltage Vt1, the switch device 908 is closed by a transition of the control signal St from a low level to a high level.

A detailed description of another circuit topology in the first embodiment is provided as follows. A second voltage-sensing unit 50 is electrically connected to a secondary side of the transformer 30 to sense a secondary-side voltage Vs of the transformer 30. The abnormal voltage signal generating unit 70 is electrically connected to the second voltage-sensing unit 50 and receives the secondary-side voltage Vs to compare it with a second threshold voltage Vt2 (as shown in FIG. 1B). When the multi-output buck converting apparatus shuts down, an external AC voltage Vac stops the power supplied to the multi-output buck converting apparatus. Because of an inherent characteristic of holding voltage for a capacitor, the secondary-side voltage Vs gradually decreases in a hold-up time Th. When the secondary-side voltage Vs is lower than the second threshold voltage Vt2, the switch device 908 is closed by a transition of the control signal St from a low level to a high level.

However, the two above-mentioned examples of sensing voltages are for demonstration and not for limitation of the present invention. Furthermore, the voltage-sensing circuits depend on the developed topologies of the switching power supply.

As shown in FIG. 1A, the main buck converter 80 mainly has a main upper-arm switch 802, a main lower-arm switch 804, a main output inductor 806, a main output capacitor 808, an auxiliary inductor 810, and an auxiliary capacitor 812. The first auxiliary buck converter 10 mainly has a first upper-arm switch 102, a first lower-arm switch 104, a first output inductor 106, and a first output capacitor 108. The second auxiliary buck converter 20 mainly has a second upper-arm switch 202, a second lower-arm switch 204, a second output inductor 206, and a second output capacitor 208.

When the multi-output buck converting apparatus shuts down, the energy stored in the first output capacitor 108 of the first auxiliary buck converter 10 can be released through a first discharging path Ld11. Namely, the stored energy does not return to the main output terminal Vo1 of the main buck converter 80 through a third discharging path Ld13. Furthermore, the energy stored in the first auxiliary buck converter 10 can be released through external loops with connected operational loads (not shown). More particularly, the first discharging path Ld11 is formed by the first output capacitor 108, the first diode 902, the active load 906, and the switch device 908. Also, the third discharging path Ld13 is formed by the first output capacitor 108, the first output inductor 106, the first upper-arm switch 102, the auxiliary inductor 810, the main output inductor 806, and the main output capacitor 808.

Similarly, when the multi-output buck converting apparatus shuts down, the energy stored in the second output capacitor 208 of the second auxiliary buck converter 20 can be released through a second discharging path Ld12. Namely, the stored energy does not return to the main output terminal Vo1 of the main buck converter 80 through a fourth discharging path Ld14. Furthermore, the energy stored in the second auxiliary buck converter 20 can be released through external loops with connected operational loads (not shown). More particularly, the second discharging path Ld12 is formed by the second output capacitor 208, the second diode 904, the active load 906, and the switch device 908. Also, the fourth discharging path Ld14 is formed by the second output capacitor 208, the second output inductor 206, the second upper-arm switch 202, the auxiliary inductor 810, the main output inductor 806, and the main output capacitor 808.

However, the above-mentioned electrical connection locations and the amount of the active load 906 and the switch device 908 are for demonstration and not for limitation of the present invention.

As can be seen from above description, the stored energy in the first auxiliary buck converter 10 and the second auxiliary buck converter 20 can be released through the energy releasing unit 90 or external loops to avoid returning the energy and rebounding the main output voltage when the multi-output buck converting apparatus shuts down.

Figure 2A:
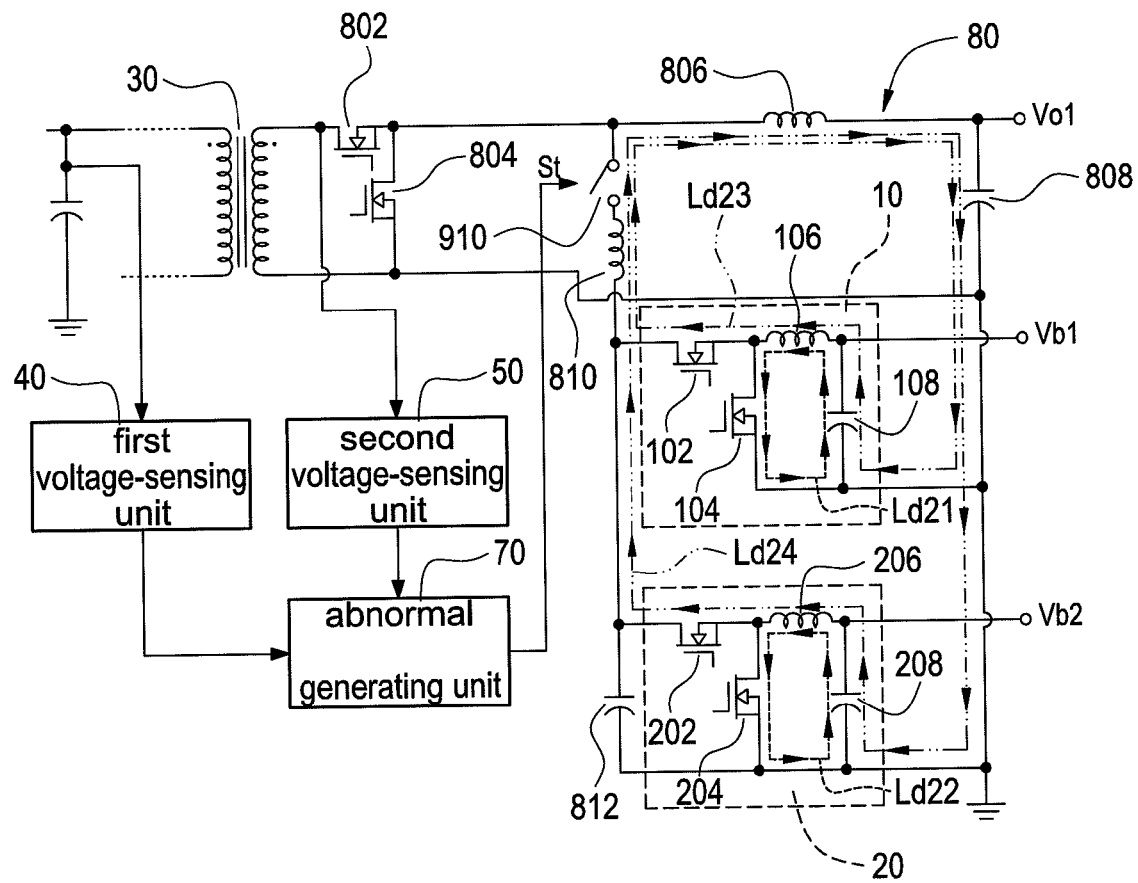
FIG. 2A is a circuit diagram of a second embodiment of a multi-output buck converting apparatus with a controllable energy-releasing function.
Figure 2B:
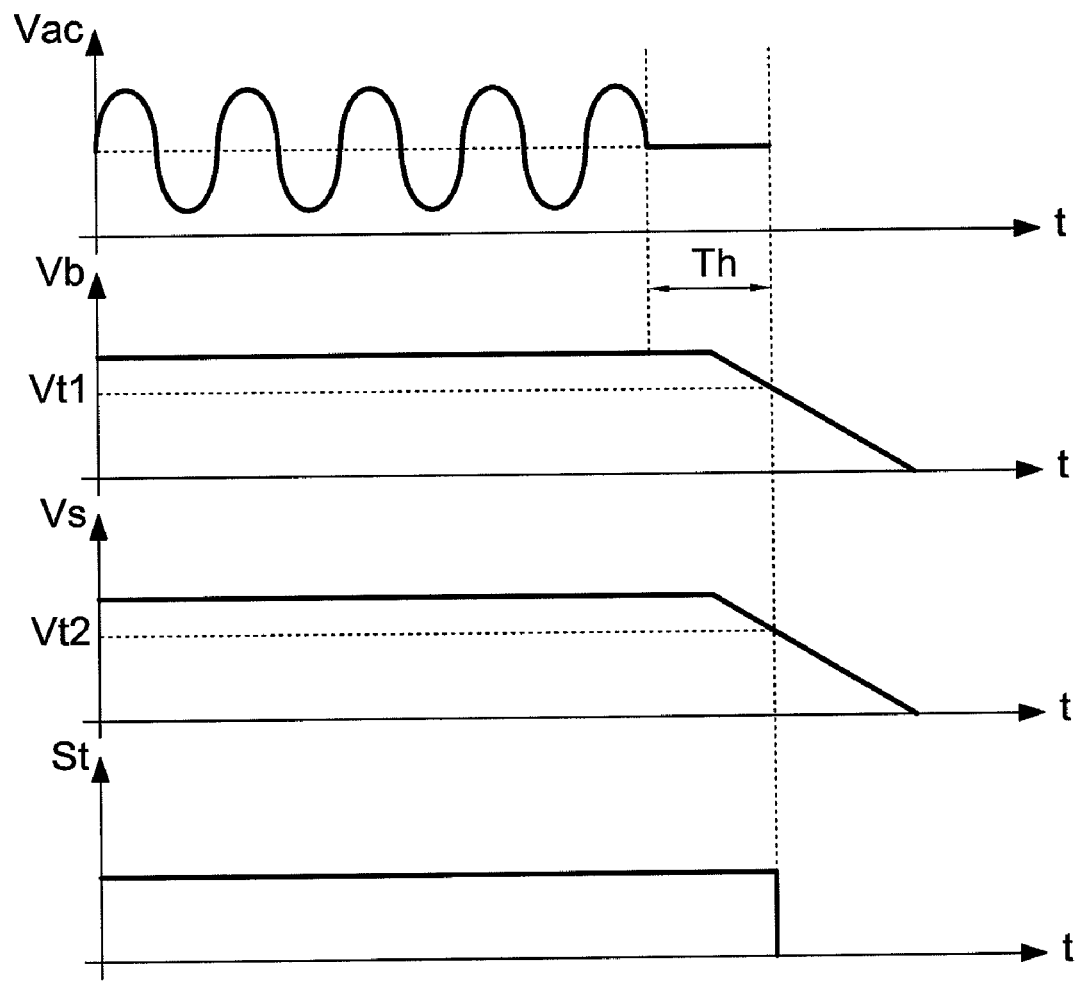
FIG. 2B is a timing diagram of shutting down the multi-output buck converting apparatus in the second embodiment.

Reference is made to FIG. 2A and FIG. 2B which are a circuit diagram of a second embodiment of a multi-output buck converting apparatus with a controllable energy-releasing function and a timing diagram of shutting down the multi-output buck converting apparatus in the second embodiment, respectively. The multi-output buck converting apparatus includes a main buck converter 80 and at least one auxiliary buck converter to provide multi-output voltages. In this example, two auxiliary buck converters are exemplified for further demonstration. Namely, the multi-output buck converting apparatus includes a first auxiliary buck converter 10 and a second auxiliary buck converter 20. The main buck converter 80 has a main output terminal Vo1 to provide a main output voltage (not labeled) to the ground (not labeled). The first auxiliary buck converter 10 is electrically connected to the main buck converter 80 and has a first auxiliary output terminal Vb1 to provide a first auxiliary output voltage (not labeled) to the ground. More particularly, the main output voltage of the main buck converter 80 is higher than the first auxiliary output voltage of the first auxiliary buck converter 10. In addition, the second auxiliary buck converter 20 is electrically connected to the main buck converter 80 and has a second auxiliary output terminal Vb2 to provide a second auxiliary output voltage (not labeled) to the ground. More particularly, the main output voltage of the main buck converter 80 is higher than the second auxiliary output voltage of the second auxiliary buck converter 20.

The multi-output buck converting apparatus further includes an energy-releasing switch device 910. The energy-releasing switch device 910 is electrically connected between an input terminal of the first auxiliary buck converter 10 and the main buck converter 80.

The multi-output buck converting apparatus further includes an abnormal voltage signal generating unit 70, and the abnormal voltage signal generating unit 70 generates a control signal St. As shown in FIG. 2A, a front-end transformer 30 is electrically connected to the main buck converter 80 to provide an energy conversion between the primary side and the secondary side.

A detailed description of one circuit topology in the second embodiment is provided as follows. A first voltage-sensing unit 40 is electrically connected to a primary side of the transformer 30 to sense a primary-side voltage Vb of the transformer 30. The abnormal voltage signal generating unit 70 is electrically connected to the first voltage-sensing unit 40 and receives the primary-side voltage Vb to compare it with a first threshold voltage Vt1 (as shown in FIG. 2B). When the multi-output buck converting apparatus shuts down, an external AC voltage Vac stops the power supplied to the multi-output buck converting apparatus. Because of an inherent characteristic of holding voltage for a capacitor, the primary-side voltage Vb gradually decreases in a hold-up time Th. When the primary-side voltage Vb is lower than the first threshold voltage Vt1, the energy-releasing switch device is opened by a transition of the control signal St from a high level to a low level.

A detailed description of another circuit topology in the second embodiment is provided as follows. A second voltage-sensing unit 50 is electrically connected to a secondary side of the transformer 30 to sense a secondary-side voltage Vs of the transformer 30. The abnormal voltage signal generating unit 70 is electrically connected to the second voltage-sensing unit 50 and receives the secondary-side voltage Vs to compare it with a second threshold voltage Vt2 (as shown in FIG. 2B). When the multi-output buck converting apparatus shuts down, an external AC voltage Vac stops the power supplied to the multi-output buck converting apparatus. Because of an inherent characteristic of holding voltage for a capacitor, the secondary-side voltage Vs gradually decreases in a hold-up time Th. When the secondary-side voltage Vs is lower than the second threshold voltage Vt2, the energy-releasing switch device 910 is opened by a transition of the control signal St from a high level to a low level.

However, the two above-mentioned examples of sensing voltages are for demonstration and not for limitation of the present invention. Furthermore, the voltage-sensing circuits depend on the developed topologies of the switching power supply.

As shown in FIG. 2A, the main buck converter 80 mainly has a main upper-arm switch 802, a main lower-arm switch 804, a main output inductor 806, a main output capacitor 808, an auxiliary inductor 810, and an auxiliary capacitor 812. The first auxiliary buck converter 10 mainly has a first upper-arm switch 102, a first lower-arm switch 104, a first output inductor 106, and a first output capacitor 108. The second auxiliary buck converter 20 mainly has a second upper-arm switch 202, a second lower-arm switch 204, a second output inductor 206, and a second output capacitor 208.

When the multi-output buck converting apparatus shuts down, the energy stored in the first output capacitor 108 of the first auxiliary buck converter 10 can be released through a first discharging path Ld21. Namely, the stored energy does not return to the main output terminal Vo1 of the main buck converter 80 through a third discharging path Ld23. More particularly, the first discharging path Ld21 is formed by the first output capacitor 108, the first output inductor 106, and the first lower-arm switch 104. Also, the third discharging path Ld23 is formed by the first output capacitor 108, the first output inductor 106, the first upper-arm switch 102, the auxiliary inductor 810, the energy-releasing switch device 910, the main output inductor 806, and the main output capacitor 808.

Similarly, when the multi-output buck converting apparatus shuts down, the energy stored in the second output capacitor 208 of the second auxiliary buck converter 20 can be released through a second discharging path Ld22. Namely, the stored energy does not return to the main output terminal Vo1 of the main buck converter 80 through a fourth discharging path Ld24. More particularly, the second discharging path Ld22 is formed by the second output capacitor 208, the second output inductor 206, and the second lower-arm switch 204. Also, the fourth discharging path Ld24 is formed by the second output capacitor 208, the second output inductor 206, the second upper-arm switch 202, the energy-releasing switch device, the auxiliary inductor 810, the main output inductor 806, and the main output capacitor 808.

However, the above-mentioned electrical connection locations and the amount of the energy-releasing switch device 910 are for demonstration and not for limitation of the present invention.

As can be seen from above description, the stored energy in the first auxiliary buck converter 10 and the second auxiliary buck converter 20 can be released through the internal discharging paths or external loops to avoid returning the energy and rebounding the main output voltage when the multi-output buck converting apparatus shuts down.

Furthermore, two or more multi-output buck converting apparatuses can be applied in the prevent invention; and, as a result, the electrical connection locations and the amount of the energy releasing unit 90 or the energy-releasing switch device 910 should be correspondingly varied for practical applications.

In conclusion, the present invention has following advantages:

1. When the multi-output buck converting apparatus shuts down, the switch device is closed to provide discharging paths to release the energy so that the multi-output buck converting apparatus normally shuts down.

2. When the multi-output buck converting apparatus shuts down, the energy-releasing switch device is opened to avoid the energy returning to the main buck converter so that the multi-output buck converting apparatus normally shuts down.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multi-output buck converting apparatus with a controllable energy-releasing function comprising a main buck converter and at least one auxiliary buck converter to provide multi-output voltages; wherein the main buck converter has a main output terminal to provide a main output voltage to the ground, and the auxiliary buck converter is electrically connected to the main buck converter and has an auxiliary output terminal to provide an auxiliary output voltage to the ground; the multi-output buck converting apparatus further comprising:
   an energy releasing unit electrically connected between the auxiliary output terminal of the auxiliary buck converter and the ground, the energy releasing unit comprising:
      a diode, having an anode terminal and a cathode terminal, and the anode terminal electrically connected to the auxiliary output terminal of the auxiliary buck converter to provide a forward conduction path for releasing energy stored in the auxiliary buck converter;
      an active load; and
      a switch device electrically connected to the active load in series to form a serially-connected unit, and one terminal of the serially-connected unit electrically connected to the cathode terminal of the diode and the other terminal of the serially-connected unit electrically connected to the ground; and
   an abnormal voltage signal generating unit electrically connected to an input terminal of the main buck converter to generate a control signal; wherein the switch device is closed by the abnormal voltage signal generating unit via a transition of the control signal from a low level to a high level when the multi-output buck converting apparatus shuts down and a voltage of the input terminal of the main buck converter is lower than a threshold voltage;
   whereby the switch device is controlled to be closed by the control signal to release the energy, which is stored in the auxiliary buck converter, through the energy releasing unit so as to avoid returning the energy to the main buck converter and rebounding the main output voltage.

2. The multi-output buck converting apparatus in claim 1, wherein the main output voltage of the main buck converter is higher than the auxiliary output voltage of the auxiliary buck converter.

3. The multi-output buck converting apparatus in claim 1, wherein the energy stored in the auxiliary buck converter is released through external loops with connected operational loads.

4. A multi-output buck converting apparatus with a controllable energy-releasing function comprising a main buck converter and at least one auxiliary buck converter to provide multi-output voltages; wherein the main buck converter has a main output terminal to provide a main output voltage to the ground, and the auxiliary buck converter is electrically connected to the main buck converter and has an auxiliary output terminal to provide an auxiliary output voltage to the ground; the multi-output buck converting apparatus further comprising:
   an energy-releasing switch device electrically connected between an input terminal of the auxiliary buck converter and the main buck converter; and
   an abnormal voltage signal generating unit electrically connected to an input terminal of the main buck converter to generate a control signal; wherein the energy-releasing switch device is opened by the abnormal voltage signal generating unit via a transition of the control signal from a high level to a low level when the multi-output buck converting apparatus shuts down and a voltage of the input terminal of the main buck converter is lower than a threshold voltage;
   whereby the energy-releasing switch device is controlled to be opened by the control signal so as to avoid returning the energy, which is stored in the auxiliary buck converter, to the main buck converter and rebounding the main output voltage.

5. The multi-output buck converting apparatus in claim 4, wherein the main output voltage of the main buck converter is higher than the auxiliary output voltage of the auxiliary buck converter.

6. The multi-output buck converting apparatus in claim 4, wherein the energy stored in the auxiliary buck converter is released through external loops with connected operational loads.

* * * * *